United States Patent [19]
Fukutake et al.

[11] Patent Number: 5,520,232
[45] Date of Patent: May 28, 1996

[54] PUNCTURE PROOF TIRE

[75] Inventors: Heiji Fukutake, Toyonaka; Minoru Abe, Katano; Toru Fujii, Kyoto, all of Japan

[73] Assignee: Kabushiki Kaisha Daikin Seisakusho, Osaka, Japan

[21] Appl. No.: 345,774

[22] Filed: Nov. 22, 1994

[30]    Foreign Application Priority Data

| Nov. 30, 1993 | [JP] | Japan | ................................. 5-063967 U |
| Nov. 30, 1993 | [JP] | Japan | ................................. 5-063968 U |
| Nov. 30, 1993 | [JP] | Japan | ................................. 5-063970 U |

[51] Int. Cl.$^6$ .................................................. B60C 7/14
[52] U.S. Cl. ........................ 152/267; 152/268; 152/302; 152/327
[58] Field of Search .................................. 152/325, 327, 152/156, 165, 200, 251, 193, 194, 271, 285, 287, 288, 205, 207, 267–269, 301, 302

[56]          References Cited

U.S. PATENT DOCUMENTS

| 437,447 | 9/1890 | Overman ................................. 152/327 |
| 565,258 | 8/1896 | Brown et al. ........................... 152/200 |
| 1,117,481 | 11/1914 | Clark ..................................... 152/302 |
| 1,264,060 | 4/1918 | Green et al. ........................... 152/269 |
| 1,287,951 | 12/1918 | Fry et al. ............................... 152/207 |
| 1,440,974 | 1/1923 | Dornburgh ............................. 152/251 |
| 1,517,239 | 11/1924 | Masury ................................... 152/327 |
| 1,600,989 | 9/1926 | Meyer ..................................... 152/325 |
| 1,758,353 | 5/1930 | Cave ....................................... 152/268 |
| 1,817,356 | 8/1931 | Fisher ..................................... 152/327 |
| 2,393,161 | 1/1946 | Haushalter ............................. 152/325 |
| 4,310,042 | 1/1982 | Wyman et al. . |

FOREIGN PATENT DOCUMENTS

| 219621 | 7/1924 | United Kingdom . |
| 411749 | 6/1934 | United Kingdom . |
| 442147 | 2/1936 | United Kingdom . |
| 2092531 | 8/1982 | United Kingdom . |

*Primary Examiner*—Geoffrey L. Knable
*Attorney, Agent, or Firm*—Shinjyu Office of Patent Attorneys

[57]          ABSTRACT

A main tire body, mounted to the rim (3) of a wheel, includes in one embodiment, an annular tire material (6) and a flat wound spring ring (8) disposed within the annular tire material (6). The annular tire material (6) is a material with a cross section that can form in a semi-circular annular space (7) between the rim (3). The flat wound spring ring (8) a is annularly arranged within the annular space (7). In another embodiment, the main tire body includes an annular first tire material (10), a second tire material (11), and a plurality of airtight chambers (15) which help to absorb impacts. The first tire material (10) is mounted to the rim (3). The second tire material (11) is an annular material with an elastic body attached to the outer peripheral side of the first tire material. The airtight chambers portion (15) are formed in the second tire material between the first tire material. In another embodiment, the main tire body includes an annular first tire material (20), and a second tire material (21). The second tire material (21) is an annular material with an elastic body attached to the outer peripheral side of the first tire material. An airtight annular chamber (22) is formed between the first tire material (20) and second tire material (21). A flat spring ring (24) disposed within the annular chamber (22) to absorb impacts.

7 Claims, 9 Drawing Sheets

PUNCTURE PROOF TIRE

BACKGROUND OF THE INVENTION

This device pertains to puncture-proof tires especially puncture-proof tires mounted to rims of wheels.

A well-known example of this type of puncture-proof tire is the solid tire disclosed in U.S. Pat. No. 4,446,903. This solid tire is formed from foam urethane rubber which has tread on the inner peripheral portion. A plurality of beads is embedded on the inside of the inner peripheral sidewall of the tire to prevent stretching due to centrifugal force. In this solid tire, if the cushioning effect of the foam urethane rubber is increased to improve the riding sensation, the amount of deformation at the road contact surface will increase as will the internal friction. If the internal friction increases, the elastic hysteresis loss will be amplified with the rolling friction increasing in proportion to this elastic hysteresis loss. As a result, power loss while driving increases, making it necessary to supply more power to move the vehicle.

A well-known example of conventional technology to reduce rolling friction is the solid tire indicated in Japanese Utility Patent Laying-Open No. 127603, 1980. This solid tire fixes a semi-triangular cross section of rubber to the rim so the top portion makes contact with the ground. It functions to reduce the rolling friction by making the surface area in contact with the ground smaller. However, because the solid tire has a cross section limited to a triangular configuration, it is difficult to improve the riding sensation. Mainly, this configuration is intended for use on racing bicycles, not for more common bicycles, such as children's bicycles or family bicycles.

SUMMARY OF THE INVENTION

One purpose of the present invention is to improve the riding sensation and reduce rolling friction in a non-pressurizable puncture-proof tire.

In a first embodiment of the invention, a tire assembly includes a first annular tire portion which mounts to the rim of a bicycle wheel and may be a standard tire size for, for instance, a bicycle wheel. A second annular portion is disposed within the first annular portion and defines at least one non-pressurizable chamber within the tire assembly. The second annular portion has a toroidal shape with a generally circular cross-section, and is formed of a resilient material providing spring-like biasing in response to deformation. The second annular portion may be formed from a flat elongated plastic or metallic material wound to form the toroidal shape.

The second annular portion, being annularly arranged within the tire, is responsive to the deformations experienced as the tire rolls over uneven surfaces and deforms while rolling, and returns to its original shape immediately afterward due to its elastic properties. The elastic hysteresis losses and rolling friction of the present invention, when compared to the losses and rolling friction experienced in a solid tire are reduced. Moreover, the riding sensation experienced by a bicycle rider riding a bicycle having tires according to the present invention are improved. Furthermore, there is no inner tube filled with pressurized air, the tire of the present invention cannot be punctured.

In another embodiment, the first annular portion and the second annular portion are bonded together and define a plurality of sealed air-tight chambers therebetween. The second annular portion is formed with a plurality of cavities on an inner radial surface thereof, such that the first annular portion seals each of the cavities.

The plurality of airtight chambers are arranged in multiple rows to have an essentially uniform cross-sectional area when cut in a radial shape from the center of the tire. Because of this, the internal friction within the tire experienced due to deformation of the tire when rolling, is less than that experienced by a solid tire. Further, the elastic hysteresis loss of the tire is also reduced, when compared to a solid tire. Here, the reduced amount of elastic hysteresis loss becomes partially uniform due to the essentially uniform cross-sectional area. As a result, the rolling friction becomes smaller at a partially uniform rate compared to a solid tire. Moreover, since it is not necessary to add a restriction on the shape of the first tire material and the second tire material, the riding sensation can be improved. Even further, because the plurality of airtight chambers, the tire is essentially puncture proof, even if several a holes are formed in the tire.

In yet another embodiment, the first annular portion and the second annular portion are bonded together sealing a single, non-pressurizable chamber. The chamber is formed with an annular recess in an annular ring-shaped elastic material is disposed. The annular ring-shaped elastic material has a semicircular cross-section in an unstressed state and is partially stressed within the annular recess.

The partially stressed state of the elastic material causes the effective spring constant of the material to decrease beyond a certain amount of deformation. However, after deformation, the elastic material returns to its original shape.

Here, because an airtight chamber is formed inside the tire, the elastic hysteresis loss becomes less compared to a solid tire and the rolling friction also becomes smaller.

Moreover, since it is not necessary to add a restriction on the shape of the first tire material and the second tire material, the riding sensation can be improved by correctly determining the elastic constant and the shape tire materials. Further, because the spring constant will decrease if the load increases more than a fixed value, when the load is more than the fixed value, the riding sensation can be improved because the displacement of the tire increases without increasing the impact felt by the rider. Even further, because the elastic material is arranged at the outer peripheral side of the airtight chamber, the tire is difficult to puncture.

DESCRIPTION OF THE PREFERRED EMBODIMENTS

Figure 1:
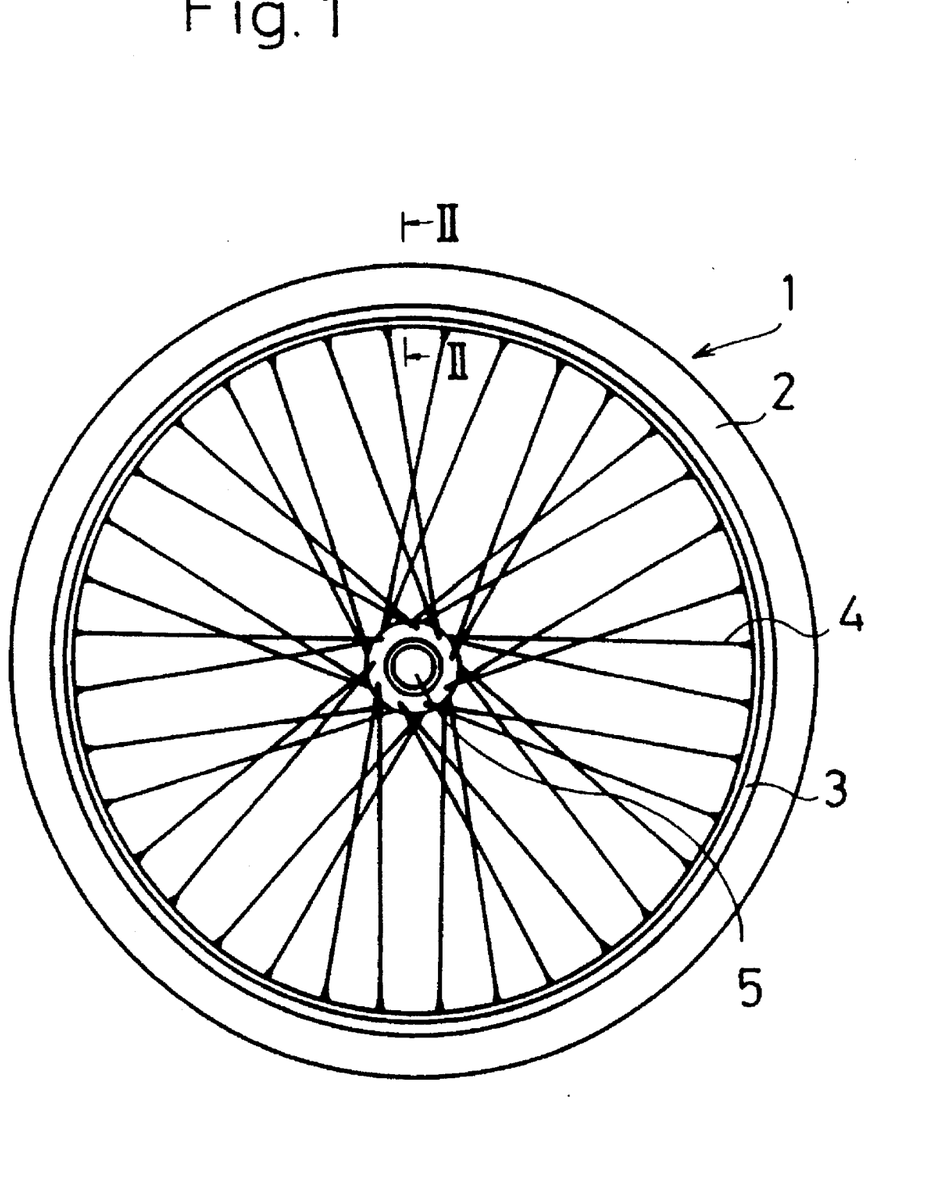
FIG. 1 is a side view of the wheel having a tire mounted thereon, the tire constructed in accordance with a first embodiment of the present invention.

These and other objects, features, aspects and advantages of the present invention will become more fully apparent from the following detailed description of the present invention when taken in conjunction with the accompanying drawings where like reference numerals denote corresponding parts throughout, in which a wheel (1) is shown in FIG. 1 includes a rim (3) with a hub (5) arranged in the center of the rim (3), on to which is mounted a main tire body (2). The wheel (1) also includes a plurality of spokes (4) that connect the hub (5) and the rim (3).

Figure 2:
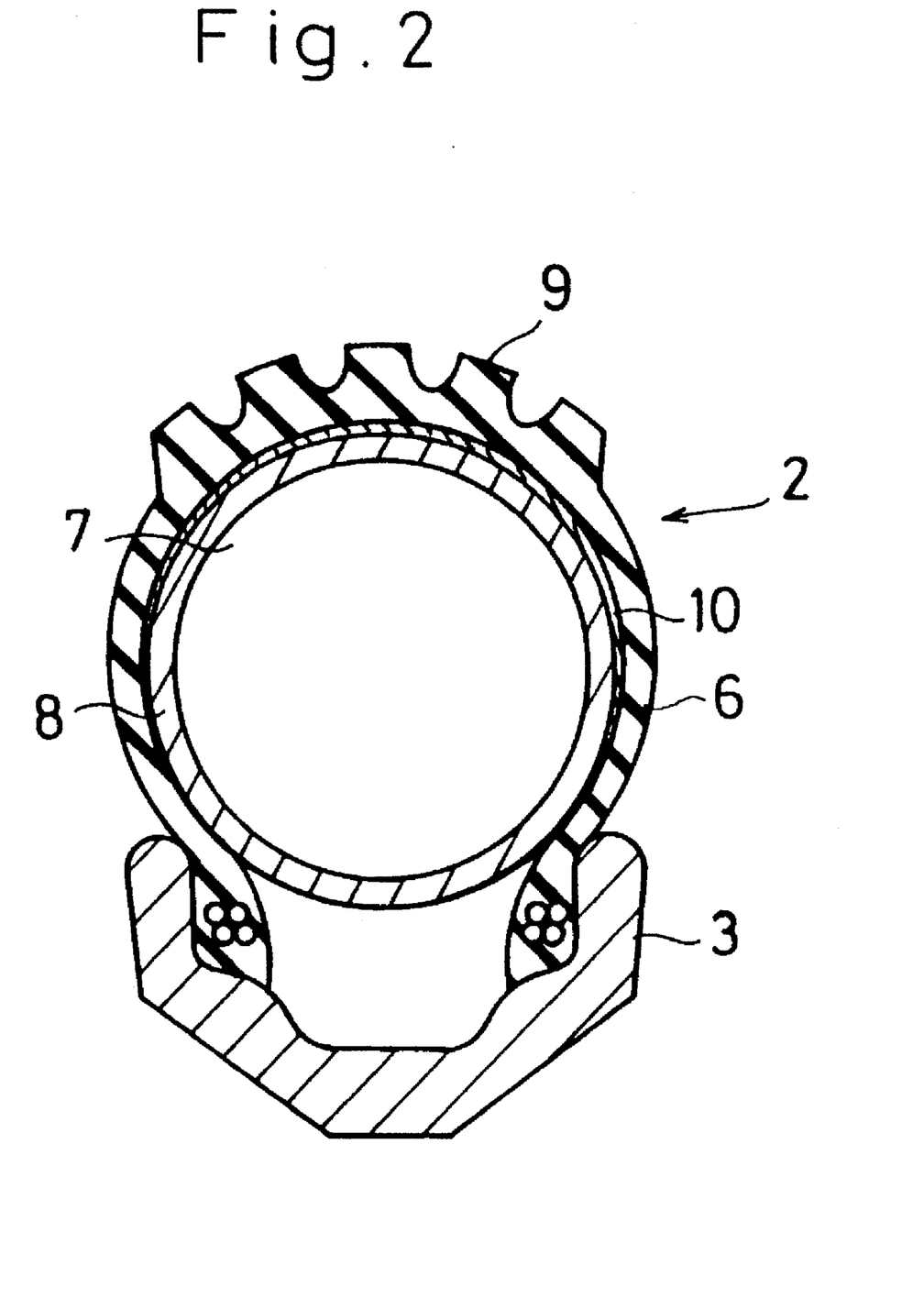
FIG. 2 is a cross-section of the tire depicted in FIG. 1, on a slightly enlarged scale, taken along the line II—II in FIG. 1, showing the tire and a spring ring element within the tire.

As shown in FIG. 2, the main tire body (2) is formed from an annular tire material (6) with a cross section that forms a semicircular annular space (7) about the rim (3). A spring ring (8) is inserted within the annular tire material (6) inner sidewall inside the annular space (7). The annular tire material (6) may be constructed and have dimensions, for instance, identical to a 26×1⅜ inch bicycle tire, or other standard size tire which is typically mounted to an inner tube filled with pressurized air. The annular tire material (6) has a carcass portion (10) formed from a bias ply belt-like material which partially attached to the inner sidewalls of the tire material (2). The outer surface of the tire material (6) is formed with a tread (9). The annular space (7) is formed between the rim (3) at the inner peripheral side of the carcass portion (10) and the paneling board (8) is inserted in the annular space (7) in place of an air filled tube.

Figure 3:
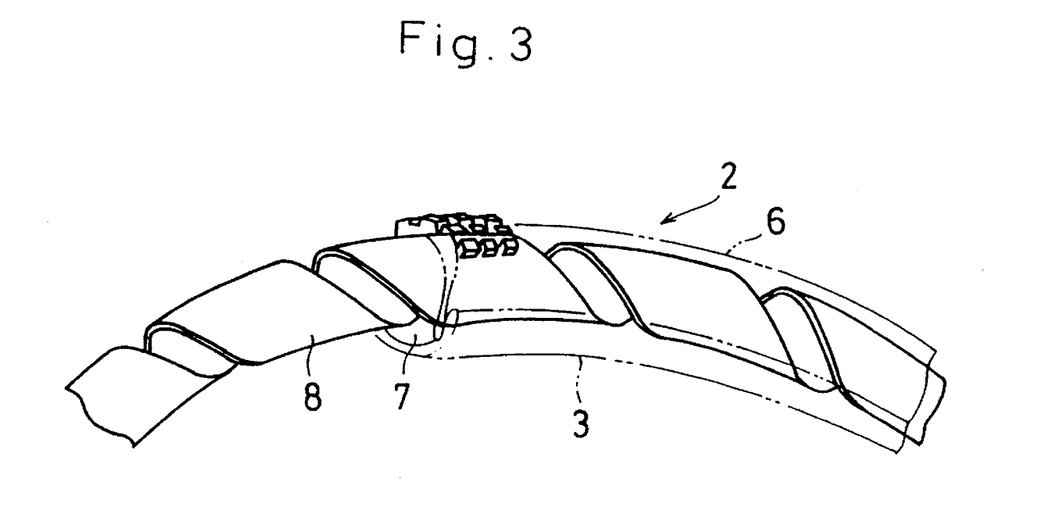
FIG. 3 is a fragmentary perspective view of the spring ring element depicted in FIG. 2.

As shown in FIG. 3, the spring ring (8) is a flat elongated spring material that has been wound to form the annular spring ring shape. Tile spring material may be either a metal or plastic fiat spring in a spiral shape. The spring ring (8) bonds to and is recessed on the inner sidewall of the annular tire material (6) and supports the cross-section shape of the annular tire material (6). For example, as shown in FIG. 2, when the cross-section shape of the inner sidewall of the annular tire material (6) is circular, the spring ring (8) maintains a circular shape.

When the wheel (1) is mounted to a lightweight vehicle such as a bicycle, the surface of the main tire body (2) that makes contact with the ground while the bicycle is driving is supported by the elastic force of the spring ring (8) that deforms in the shaft direction depending on the load with the cross section becoming slightly flattened. Then, when the tire separates from the surface of the ground, the main tire body (2) will immediately return to a circular cross section due to the elastic force of the fiat spring ring (8) as shown in FIG. 2. Because the internal friction is small, the elastic hysteresis loss when tile tire is rolling is small compared to a solid tire. Consequently, the rolling friction becomes smaller and loss during operation decreases. Further, since it is not necessary to restrict the shape of the annular tire material (6), the riding sensation can be improved by properly choosing the spring constant of the flat spring ring (8). Even further, because the fiat spring (8) is arranged within the inner sidewall of the annular tire body, there is no possibility of a tire puncture, since no pressurized air is present within the tire.

Figure 4:
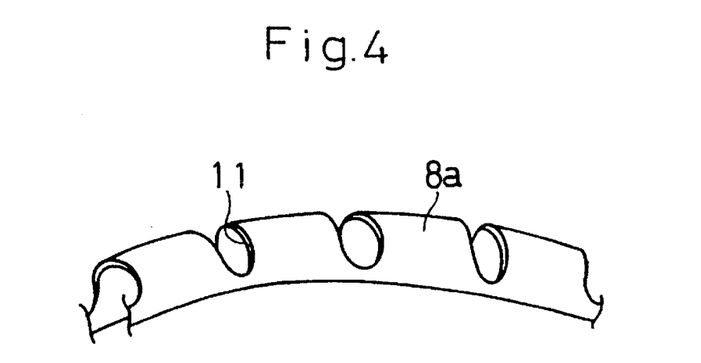
FIG. 4 is a fragmentary perspective view, similar to FIG. 3, showing the spring ring depicted in FIG. 2 according to a second embodiment of the present invention.

In a second embodiment, as shown in FIG. 4, a flat spring is bent in a cross section semi-U shape forming an annular elastic ring (8a) which is inserted inside the annular tire material (6). Along a an outer radial portion of the elastic ring (8a), long circular cuts (11) are formed at intervals separated in the peripheral direction. Even using this type of elastic ring (8a), effects generally identical to those described above with respect to the spring ring (8) can be obtained. Moreover, the elastic ring (8a) can be split in the peripheral direction.

Because a ring-shaped elastic material is annularly arranged to conform to the inner sidewall of the annular tire material within the annular space in a puncture-proof tire, the elastic hysteresis loss while the tire is returning to its original shape is reduced and the rolling friction becomes smaller compared to a solid tire. Furthermore, the elastic properties of the ring put little limitation on the shape of the annular tire, and therefore the riding sensation can be improved. Even further, because the elastic material is arranged to conform to the inner sidewall of the tire, it cannot be punctured.

Figure 5:
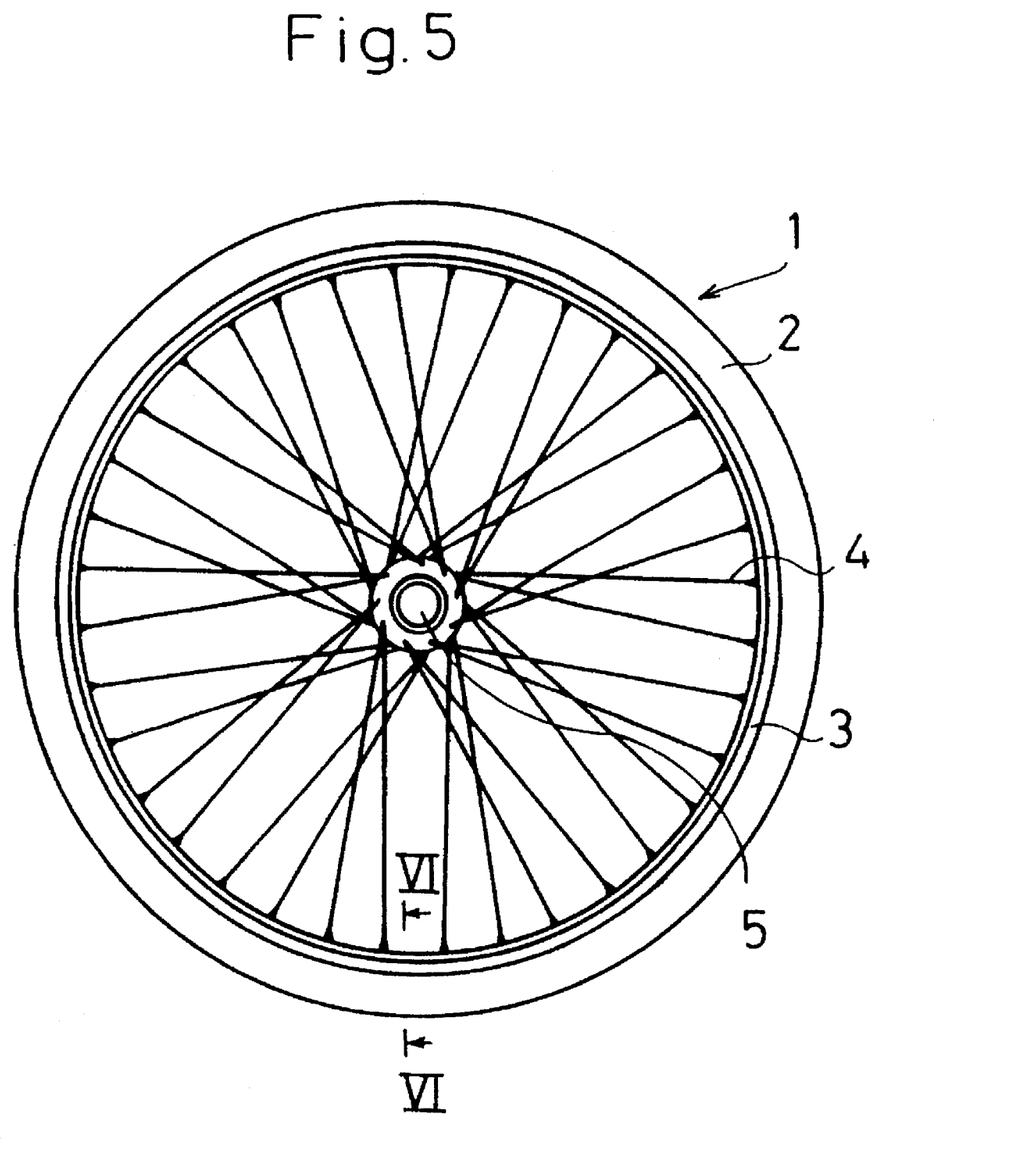
FIG. 5 is a side view of a wheel, similar to FIG. 1, showing a tire constructed in accordance with a third embodiment of the present invention.

In a third embodiment, the wheel (1) in FIG. 5 is, like the previous embodiments, a standard sized tire, for example, a 26 inch×1⅜ inch wide wheel for a bicycle and includes a main tire body (2a), a rim (3), a hub (5) arranged in the center of the wheel (1), and a plurality of spokes (4) that connect the hub (5) and the rim (3).

Figure 6:
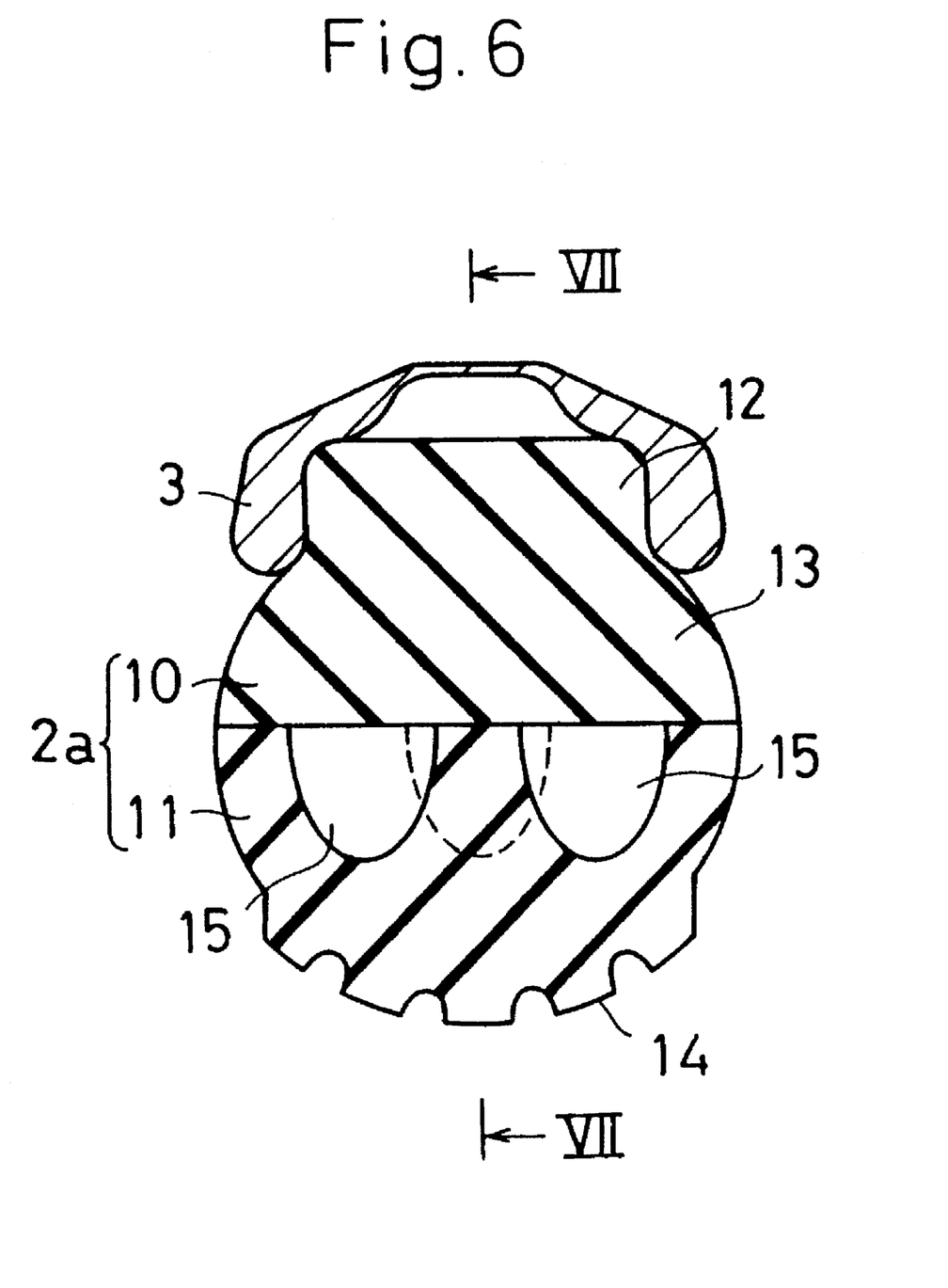
FIG. 6 is a cross section of the tire depicted in FIG. 5, on a slightly enlarged scale, taken along the line VI—VI in FIG. 5.

As shown in FIG. 6, the main tire body (2a) is formed from a first tire material (10) arranged on the rim (3), and a second tire material (11) fixed to the outer peripheral side of the first tire material (10). The first tire material (10) is formed by urethane rubber with a low elasticity rate and the second tire material is formed by a very pliable foam urethane rubber. Further, the first tire material (10) is formed with an attachment portion (12) with a semi-rectangular cross section which conforms in shape to the rim (3), and an internal peripheral portion extending from the attachment portion (12) in a cross-sectional partial semicircle. A tread (14) is formed on the external peripheral portion of the second tire material (11). A plurality of sealed, airtight chambers (15) each having a half oval shaped cross-sectional area are formed, on an inner surface of the tire material (11) such that the chambers (15) are positioned between the second tire material (11) and the first tire material (10).

Figure 7:
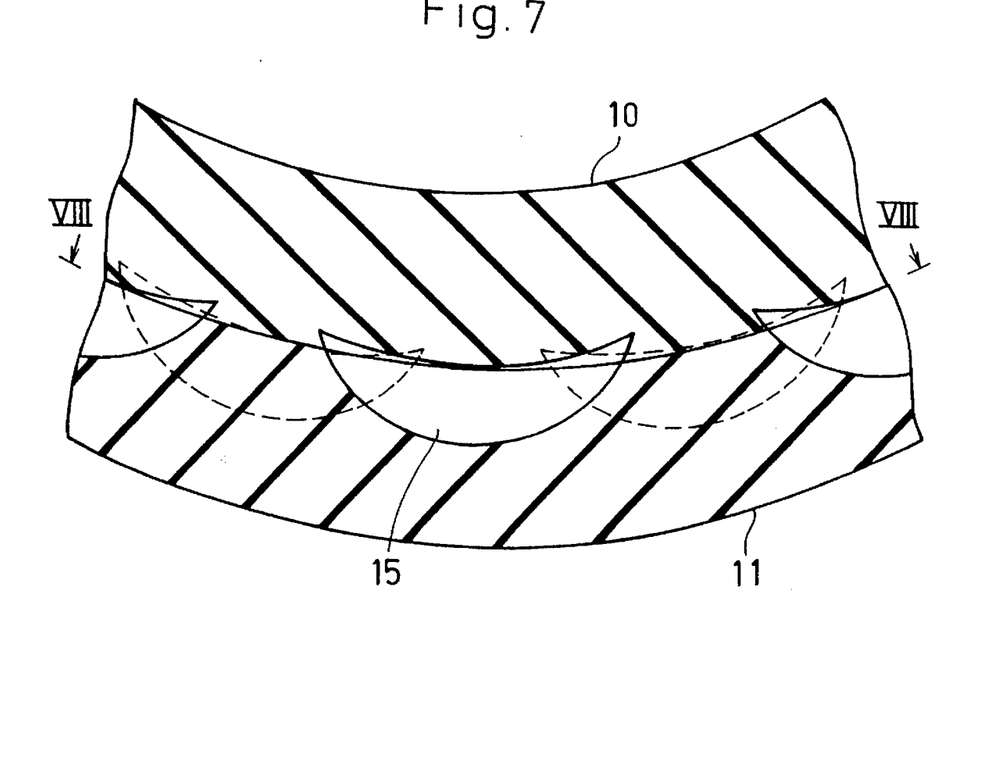
FIG. 7 is a fragmentary cross section of the tire depicted in FIGS. 5 and 6, on a slightly enlarged scale, taken along the line VII—VII in FIG. 6.
Figure 8:
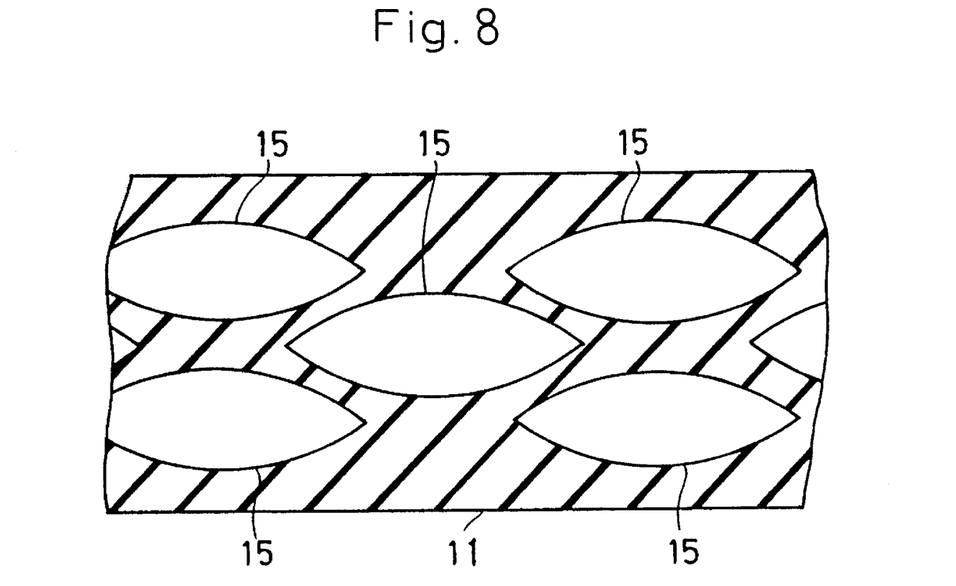
FIG. 8 is a fragmentary cross section of the tire depicted in FIGS. 5–7, taken along the line VIII—VIII in FIG. 7.

As shown in FIGS. 7 and 8, the airtight chamber portion (15) has a crescent shape in a side section view and an uneven rugby ball shape in a longitudinal view. The airtight chambers (15) are arranged such that overlapping alternating rows of a row with one chamber and then a row with two chambers side by side, the rows extending the annular length or circumference of the second tire material (11). Moreover, the cross-sectional area when cut in a radial shape from the tire center of the airtight chamber portion (15) is arranged to be essentially uniform, as is indicated in FIG. 8.

When the wheel (1) rotates, the portion making contact with the ground deforms. Following this, elastic hysteresis loss due to internal friction occurs although the elastic hysteresis loss becomes less compared to a solid tire because the airtight chamber portion (15) is formed internally. Because the cross-sectional area of the airtight chamber portion (15) is uniform, this reduced amount of elastic hysteresis loss becomes partially uniform. As a result, the rolling friction becomes smaller compared to a solid tire. Consequently, if this is used in a bicycle, power loss while riding will be reduced and the rider will be able to ride the bicycle with less effort.

Also, because there are a plurality of airtight spaces (15), if one or two airtight space (15) are punctured, the effect will not spread to the entire structure, thus allowing the vehicle to continue rolling fairly smoothly. Consequently, puncture-proof performance can be achieved. Further, because there is no restriction on the shape of the tire, the riding sensation can be improved by determining the size of the airtight chamber portion (15) according to the needs of a specific tire application and the expanding rate of the foam urethane rubber. The inner peripheral side of the first tire material (10) also has a low elastic force and is difficult to stretch even when subjected to centrifugal force while driving. Because of this, the main tire body (2) can be prevented from slipping off front the rim.

Further, the following alternative aspects of the third embodiment are contemplated:

(a) The shape of the airtight spaces is not restricted to the above described shape and can be a shape with an essentially uniform cross-sectional surface area;

(b) The position the airtight chambers is not restricted to the described positions and can be arranged in a variety of other configurations, or may be formed on the first tire material;

(c) The invention is not only restricted to bicycles tires but also can be used in automobile and other related tire applications.

In puncture-proof tires, a plurality of airtight chambers are formed and set in a line in the peripheral direction between the first tire material and second tire material arranged to have an essentially uniform cross-sectional area when cut in a radial shape from the center of the tire. Further, because; these airtight chambers are arranged to have an essentially uniform cross-sectional area when cut in a radial shape from the center of the tire, internal friction while the tire deforms becomes less compared to a solid tire and elastic hysteresis loss is also reduced. Here, the reduced amount of elastic hysteresis loss becomes partially uniform due to the essentially uniform cross-sectional area of the airtight chamber portion. As a result, the rolling friction becomes smaller at a partial uniform rate compared to a solid tire. Moreover, since it is not necessary to add a restriction on the shape of the first tire material and the second tire material, the riding sensation can be improved. Even further, because the plurality of airtight spaces is arranged, even if a hole is opened in one of those, the tire will not be punctured.

Figure 9:
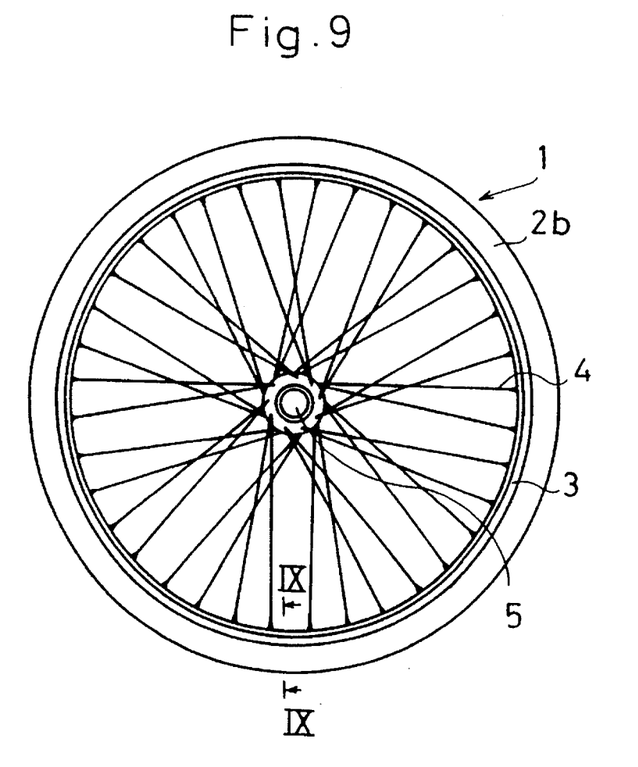
FIG. 9 is a side view of a wheel, similar to FIGS. 1 and 5, showing a tire constructed in accordance with a fourth embodiment of the present invention.
Figure 10:
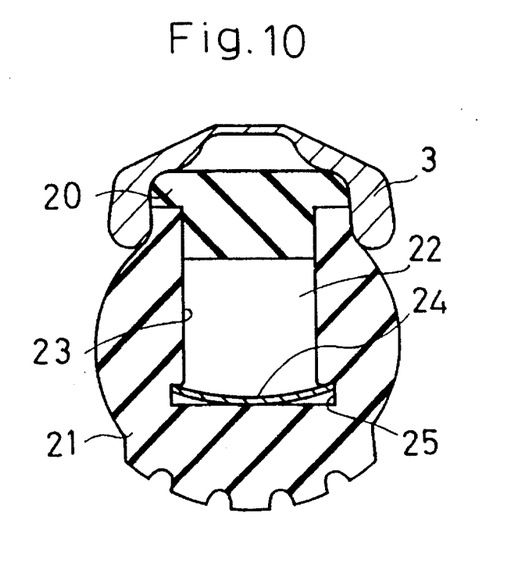
FIG. 10 is a cross section of the tire depicted in FIG. 9, taken along the line IX—IX in FIG. 9.
Figure 11:
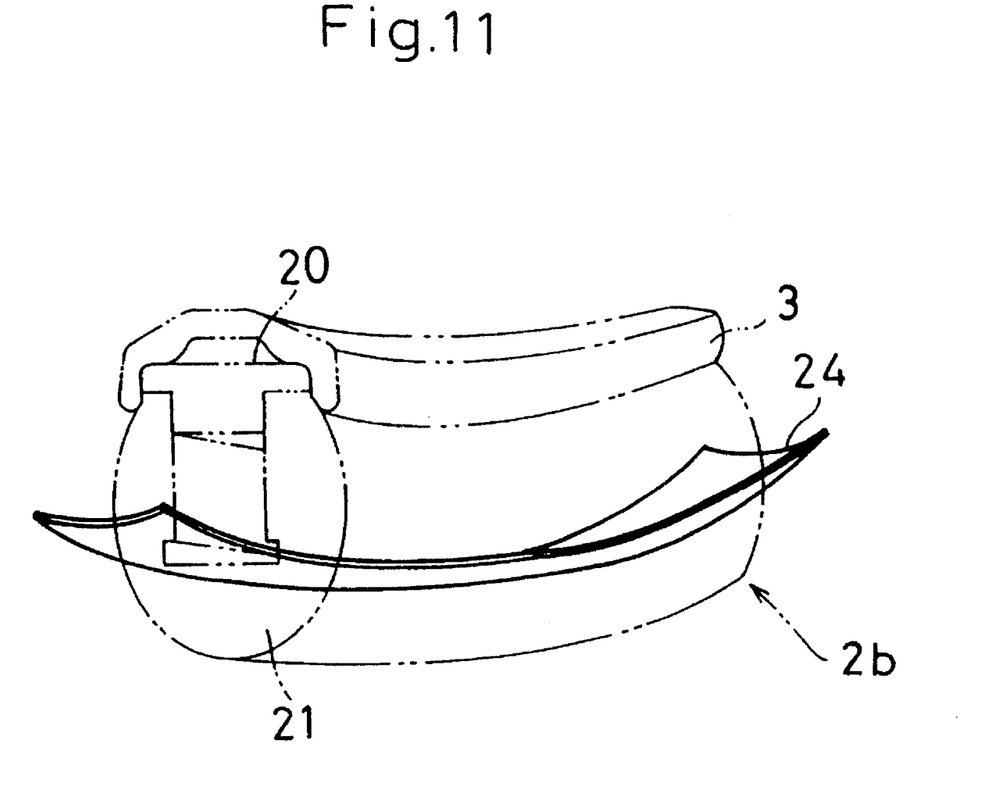
FIG. 11 is fragmentary perspective view of an elastic spring ring disposed within the tire depicted in FIGS. 9 and 10, with the tire shown in phantom.

In a fourth embodiment depicted in FIGS. 9–11, the wheel (1) includes, for example, a main tire body (2b) having, for instance, the dimensions and shape of a 26 inch×1⅜ inch bicycle tire. The wheel also includes a rim (3), a hub (5) arranged in the center, and a plurality of spokes (4) that connect the hub (5) and the rim (3).

The main tire body (2b) has a first tire material (20) with a flat T-shaped cross-section, mounted to the rim (3), and a second tire material (21) fix to the outer peripheral side of the first tire material (20). The first tire material (20) is of, for instance, an annular urethane material with low expansion and contraction properties which makes it difficult to slip off from the rim (3). The second tire material (21) is a very pliable foam urethane rubber annular material that takes into consideration cushioning properties and has an annular channel (23) formed inside to form an annular chamber (22) sealed with respect to the first tire material (20) to form a semi-rectangular shape.

A wide containment portion (25) in the form of a pair of opposing recesses extending into opposing sides of the second tire material (20) is formed at the bottom of the annular channel (23) and annular flat spring ring (24) is disposed within the containment portion (25).

Figure 12:
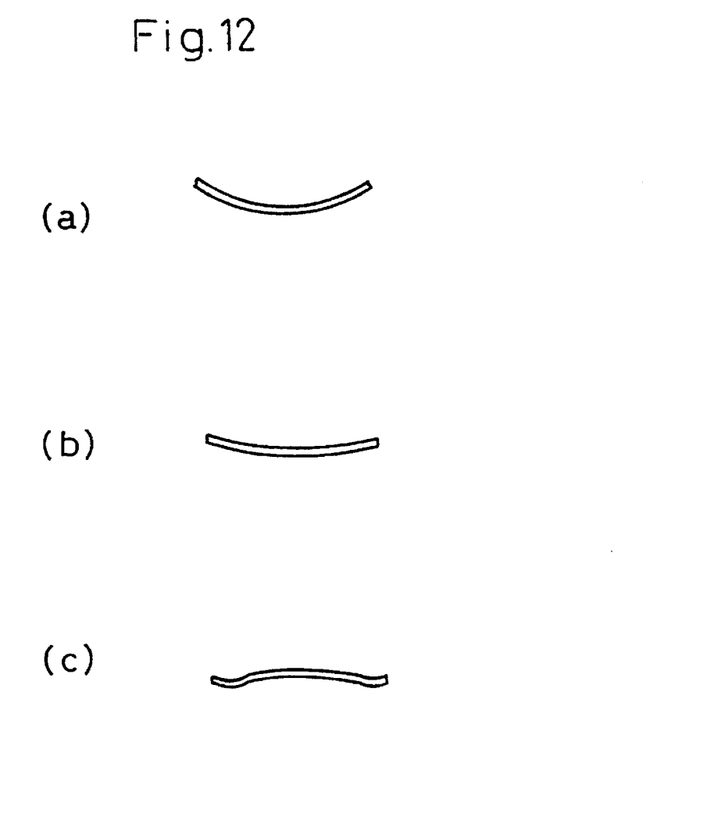
FIGS. 12a, 12b and 12c are cross section views of the elastic spring ring depicted in FIG. 11, showing various stages deformation.

As shown in FIGS. 11 and 12, the flat spring ring (24) is a ring-shaped material which has, in cross-section, a curved contour. The outside diameter of the flat spring ring (24) is approximately equal to inner diameter of the annular chamber (22) inside the second tire material (21). FIG. 12(a) shows the cross section contour or shape of the flat spring ring (24) in a free state, as would be observed when the spring ring (24) is not installed in the containment portion (25). FIG. 12(b) shows the spring ring (24) in the shape experienced when the spring ring is disposed within the containment portion (25) where the confinement of the spring ring (24) within the containment portion (25) applies tension to the outer peripheral sides of the spring ring (25). In other words, when the spring ring (24) is disposed within the containment portion (25), it is under tension due to the deformation of the spring ring cause by forcing the spring ring to conform to the shape of the containment portion (25) where the degree of curvature of the spring ring is reduced. Also, as shown in FIG. 12(c), if a load is applied while the tire is making contact with the road, the center portion of the cross section will elasticity deform so it recesses radially inwardly.

Figure 13:
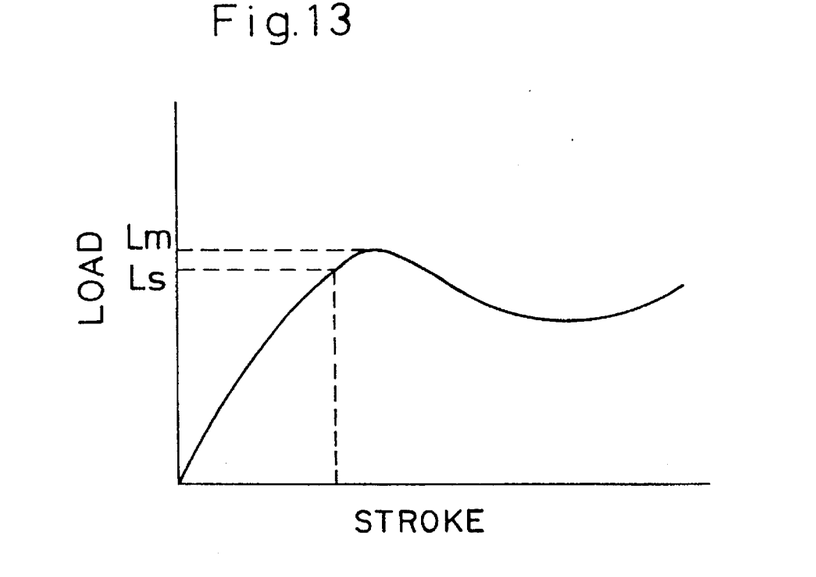
FIG. 13 is a graph showing the load characteristics of the elastic spring ring depicted in FIGS. 11 and 12.

FIG. 13 shows the characteristics of the spring ring (24). The flat spring ring (24) attaches to the containment portion (25) by the application of load Ls. Moreover, when load Lm which is larger than load Ls, is applied, the spring constant becomes smaller in proportion to increases of that load. As a result, the stroke of the flat spring ring (24) lengthens which makes it easier to absorb shocks.

When the wheel (1) is mounted to a bicycle and a load applied to the bicycle, the portion of the main tire body (2b) making contact with the ground elasticity deforms. Then, when the tire separates from the surface of the ground due to driving, it will return to its original shape because of the second tire material (21) and the elastic force of the flat spring ring (24). The internal friction during this elastic deformation becomes smaller compared to a solid tire since the annular chamber portion (22) is provided. As a result, the elastic hysteresis loss becomes less and the rolling friction also decreases compared to a solid tire. Because of this, power loss during riding is reduces allowing power to be efficiently transferred to the surface of the ground. Furthermore, since it is not necessary to add a restriction on the shape of the tire, the riding sensation can be improved. Even further, even if a hole is opened in the annular chamber portion (22), the tire will not puncture because the second tire material (21) will be maintained by the flat spring ring (24). Also, if a load large load is applied bigger than a normal load, the spring constant of the flat spring ring (24) will become smaller and the amount of deformation bigger. Consequently, even if a big load is applied, it can be reliably absorbed by the big stroke while reducing the shock transferred to the driver.

In addition to bicycle wheels, this tire can also be used in wheels of other vehicles such as push carts and forklifts.

In puncture-proof tires related to this device, because an annular airtight chamber portion is formed between the first tire material and the second tire material together with an annular board-shaped elastic material arranged on the outer peripheral side of the airtight chamber portion, compared to a solid tire, the internal friction is reduced and the rolling resistance also becomes less.

Further, because the spring constant becomes smaller with an increase in the load, when a big load is applied, the amount of elastic deformation will increase allowing the riding sensation to be improved. Even further, because an annular board-shaped elastic material is arranged on the outer peripheral side of the airtight chamber portion, the tire will not be punctured.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A puncture-proof tire assembly comprising:

a first annular portion engagable with the rim of a wheel;

a second annular portion engaging said first annular portion, said first and second annular portions defining at least one non-pressurizable chamber within the tire assembly with a pair of opposing recesses formed in said second annular portion, said pair of opposing recesses extending from said non-pressurizable chamber into opposing sides of said second annular portion; and an annular spring retained in said pair of opposing recesses.

2. A puncture-proof tire assembly as set forth in claim 1 further comprising:

said first annular portion and said second annular portion being bonded together sealing said non-pressurizable chamber.

3. A puncture-proof tire assembly is set forth in claim 1, wherein said annular spring has a semicircular cross-section in an unstressed state and is partially stressed within said opposing recesses.

4. A puncture-proof tire assembly comprising:

a first annular portion engagable with the rim of a wheel, said first annular portion defining an inner annular surface of a tire assembly;

a second annular portion fixed to said first annular portion, said second annular portion defining an outer annular surface of said tire assembly, said second annular portion having an elongated channel formed therein such that said first annular portion encloses said elongated channel defining a non-pressurizable chamber within said tire assembly, said elongated channel being formed with a pair of opposing recesses, said pair of opposing recesses extending from said non-pressurizable chamber into opposing sides of said second annular portion; and an annular spring retained in said pair of opposing recesses.

5. A puncture-proof tire assembly as set forth in claim 4 wherein said annular spring has a semicircular cross-section.

6. A puncture-proof tire assembly as set forth in claim 4 wherein said annular spring has a semicircular cross-section in an unstressed state and is partially stressed within said opposing recesses.

7. A puncture-proof tire assembly as set forth in claim 4 wherein said second annular portion is formed with a tire tread on an outer circumferential surface.

* * * * *